United States Patent [19]

Orlando

[11] Patent Number: 6,020,082
[45] Date of Patent: Feb. 1, 2000

[54] INTEGRATED BATTERY IDENTIFICATION SYSTEM AND METHOD FOR DETERMINATION OF BATTERY TYPE AND VOLTAGE LEVEL OPERABILITY

[75] Inventor: Richard Vincent Orlando, Los Gatos, Calif.

[73] Assignee: Summit Microelectronics, Inc., Campbell, Calif.

[21] Appl. No.: 09/026,284

[22] Filed: Feb. 19, 1998

[51] Int. Cl.[7] ................................. H01M 10/48
[52] U.S. Cl. ................................. 429/7; 429/90
[58] Field of Search ..................... 429/94, 122, 127, 429/128, 162, 160, 158, 210, 219, 220, 7, 8, 90, 93

[56] References Cited

U.S. PATENT DOCUMENTS

| | | | |
|---|---|---|---|
| 3,375,136 | 3/1968 | Biggar | 429/241 |
| 4,313,986 | 2/1982 | Magnotta | 428/40 |
| 4,900,643 | 2/1990 | Eskra et al. | 429/241 |
| 5,059,895 | 10/1991 | Cataldi et al. | 324/104 |
| 5,460,901 | 10/1995 | Syrjälä | 429/90 |
| 5,656,917 | 8/1997 | Theobald | 320/22 |

*Primary Examiner*—Maria Nuzzolillo
*Assistant Examiner*—Monique M. Wills
*Attorney, Agent, or Firm*—Sabath & Truong; Robert P. Sabath

[57] ABSTRACT

A battery type identification system for determining the type of a selected battery and its operational status as a function of type. A battery has spaced bands of selected conductivity to define an identification code used to identify the battery. An appliance using batteries (e.g., a consumer product) includes an array of conductivity detectors spaced to engage corresponding battery identification bands. The battery types identification system determines battery kinds of predetermined type and then determines the voltage of the battery to assess its operability status.

11 Claims, 2 Drawing Sheets

INTEGRATED BATTERY IDENTIFICATION SYSTEM AND METHOD FOR DETERMINATION OF BATTERY TYPE AND VOLTAGE LEVEL OPERABILITY

BACKGROUND OF THE INVENTION

1. Field of the Invention

The field of the present invention relates to battery type identification and operability determination and more particularly to integrated battery identification systems and methods for determining the types of non-rechargeable batteries powering selected appliances.

2. Description of Related Art

The related art is not known to address technical issues relating to identification of battery type and determination of operability status in view of the type of battery used with a particular appliance, such as for example without limitation a mobile computer, a pager, or other communication device. Particular appliances include electrical systems for measuring the voltage levels of batteries used to power a particular device. Different batteries, as is well known, however have different voltage characteristics as a function of time. In particular, one battery may decline gradually in power, leaving ample time for replacement. Other batteries decline dramatically at the end of useful lifetime. In each case, it is useful to assess the current voltage level in view of its particular battery type. It is not known whether a current system exists for establishing battery type electrically as a function independent of the actual measurement of the existing voltage level of the subject battery.

SUMMARY OF THE INVENTION

According to the present invention, a battery has conductive ends of opposite polarity and an outer surface electrically isolating the conductive ends of the battery. The outer surface of the battery has multiple zones bands of selected conductivity according to one embodiment of the present invention to define a coded binary word indicating the battery type. The binary word is compared with predetermined type identification information stored in a memory according to the present invention.

The conductivity of the respective bands is detected by a detection element array according to one embodiment of the present invention. According to this embodiment, the detection array is mounted in a battery cavity of the subject appliance. According to one embodiment of the present invention, the detection array is mounted onto a mounting surface of the subject appliance. If a particular band is non-conductive according to one embodiment of the present invention, the corresponding detection element senses that the particular band exhibits an electrical state of non-conductivity. Similarly, if the band is conductive, the status of that band as being conductive is noted as well by a detection element according to one embodiment of the present invention. According to a method of the present invention, the type of a particular battery is identified and an assessment of the adequacy of the current power level for battery operability is made.

DETAILED DESCRIPTION OF THE PREFERRED EMBODIMENT

Figure 1:
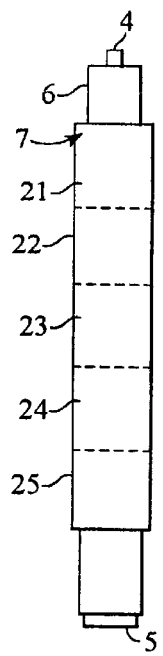
FIG. 1 is a side schematic diagram of a battery including a conductive band divided into a predetermined number of cylindrical sensing zones according to an embodiment of the present invention.

FIG. 1 is a side schematic diagram of an electric battery 3 configured according to one embodiment of the present invention. In particular, battery 3 includes an electrically conductive positive voltage terminal 4; an electrically conductive negative voltage terminal 5, a non-conductive central body including a central surface region (CSR) 6 electrically isolating the positive and negative voltage terminals from each other, and a conductive band 7 divided into a predetermined number of virtual identification sensing zones 21–25 according to one embodiment of the present invention. Conductive band 7 according to one embodiment of the present invention is fabricated with a foil layer, or film of a selected conductive material such as copper or silver for example without limitation. According to one embodiment of the present invention, the conductive material is secured onto CSR 6 during fabrication with an adhesive or epoxy. Conductive band 7 according to one embodiment of the present invention includes a plurality of spaced virtual identification zones of the same or different conductivity level. The foil or other conductive material is deposited or otherwise secured substantially according to one embodiment of the present invention around the circumference of the battery 3. According to one embodiment of the present invention, each virtual identification sensing zone is a separate circumferential or substantially circumferential foil.

Figure 2:
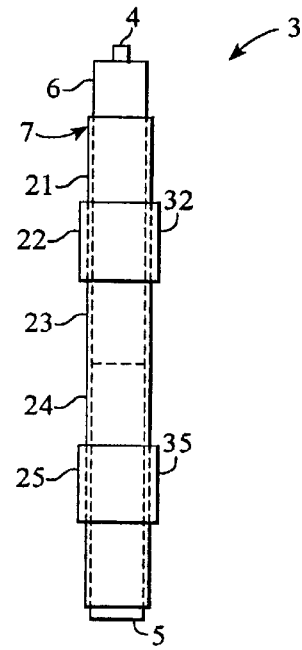
FIG. 2 is a side schematic diagram of a battery including a conductive band having selected non-conducting layers superimposed over selected zones of the conductive band according to one embodiment of the present invention.

FIG. 2 is a side schematic diagram of a battery including electrically conductive positive voltage terminal 4, an electrically conductive negative voltage terminal 5, a non-conductive central body including a central surface region (CSR) 6 electrically isolating the positive and negative voltage terminals from each other, and a conductive band 7 divided into a predetermined number of virtual identification sensing zones 21–25 and non-conductive electrically detective identification band having variably applicable non-conducting layers 32 and 35 superimposably settable over the conductive electrically detective identification band according to one embodiment of the present invention. The non-conductive layers 32, 35 according to one embodiment of the present invention include first layer 32 secured over second zone 22 of conductive band (CB) 7 and second layer 35 secured over fifth zone 25 of conductive band 7. According to one embodiment of the present invention, first and second layers 32 and 35 are secured over corresponding zones 22 and 25 of CB 7 by applying or sputtering non-conductive paint or another material in a sufficient amount and distribution over the applicable regions of CB 7. Layers 32 and 35 are thick film or thin film layers (e.g., including thick thin film or thin thick film) according to well known sputtering or deposition arts. As will be seen in detail below, the settability of conductive and non-conductive bands at circumferential zones at specified attitudes or latitudes of battery 43 permits establishment of coding according to the present invention.

Figure 3:
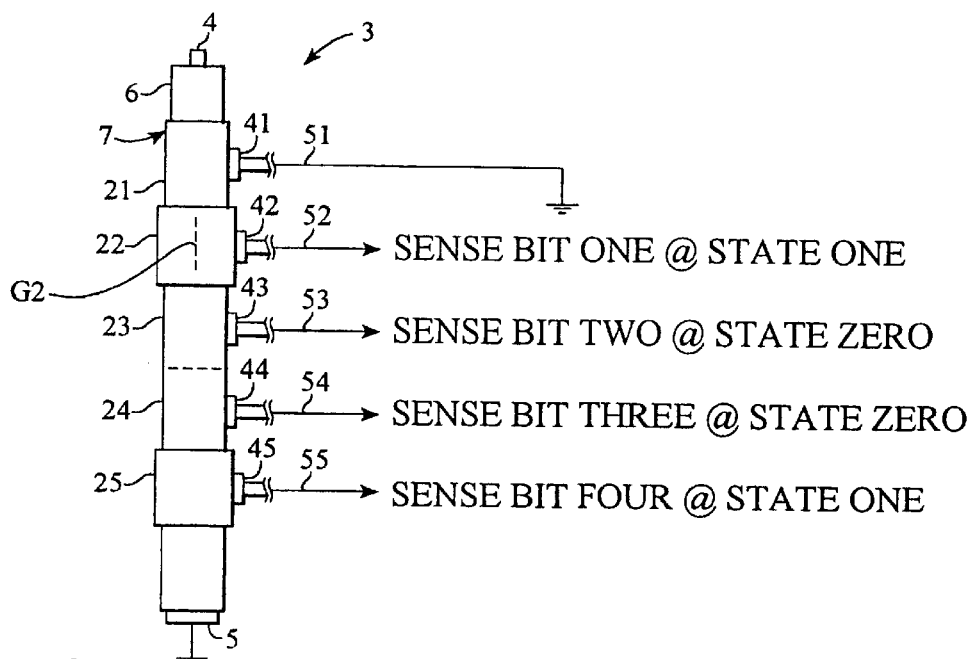
FIG. 3 is a side schematic diagram of a battery including a conductive band having selected non-conducting layers superimposed over the conductive band, including a plurality of sensing elements each including a biased electrical contact and a connected or associated output line for carrying electric current according to one embodiment of the present invention.

FIG. 3 is a side schematic diagram of a battery including electrically conductive negative voltage terminal 5, a non-conductive central body including a central surface region (CSR) 6 electrically isolating the positive and negative voltage terminals from each other, and a conductive band 7 divided into a predetermined number of virtual identification sensing zones 21–25, and non-conductive electrically detective identification bands having selected non-conducting layers superimposed over the conductive band 7, including a plurality of sensing elements, each including a biased electrical contact and a connected output line for carrying electric current, according to one embodiment of the present invention. In particular, each of zones 21–25 in conductive band 7 is electrically interconnected and grounded, as is the negative pole 5 of battery 3. The electrical connection under non-conducting band 32 and between zones 21 and 23 is represented by dashed line 62. According to one embodiment of the present invention, battery 3 is placed within a selected electrical appliance (not shown) such as a communications device, a pager, or a cellular telephone for example. The particular appliance or other device includes a plurality of parallel electric leads 51–55, for example. Each of leads 51–55 is connected to a corresponding contact 41–45 which is biased in a selected fashion, such as by biasing the contacts to a predetermined setting or position prior to battery insertion in the appliances, or by constructing a spring biasing arrangement for example which ensures lateral contact with corresponding zones or regions of a subsequently inserted battery for the respective contacts. Contact 41 according to one embodiment is electrically in contact with band 7 at its zone 21. Contact 42 is electrically in contact with non-conducting layer 32. Contact 43 is in contact with band 7 at zone 23. Contact 44 is in contact with non-conducting layer 35. According to one embodiment of the present invention, contacts 41, 43 and 44 are thus each grounded and produce a logical state zero output value in corresponding sense lines 51, 53 and 54. The remaining sense lines 52 and 55 produce corresponding logical state one values based upon the electrically non-conducting nature of layers 32 and 35. As a consequence, sense lines 52–55 produce a word bit sequence according to one embodiment of the present invention including the logical values one, zero, zero, one (i.e., "1001") which can be used to identify the type of battery on which this particular sequence of conductive and non-conductive bands is patterned. With a four bit word $2^n=16$ different battery types can be identified with the band patterning shown on selected batteries. This permits the appliances using these batteries to identify their types to enable voltage and operability monitoring by stored characteristics of particular battery types.

Figure 4:
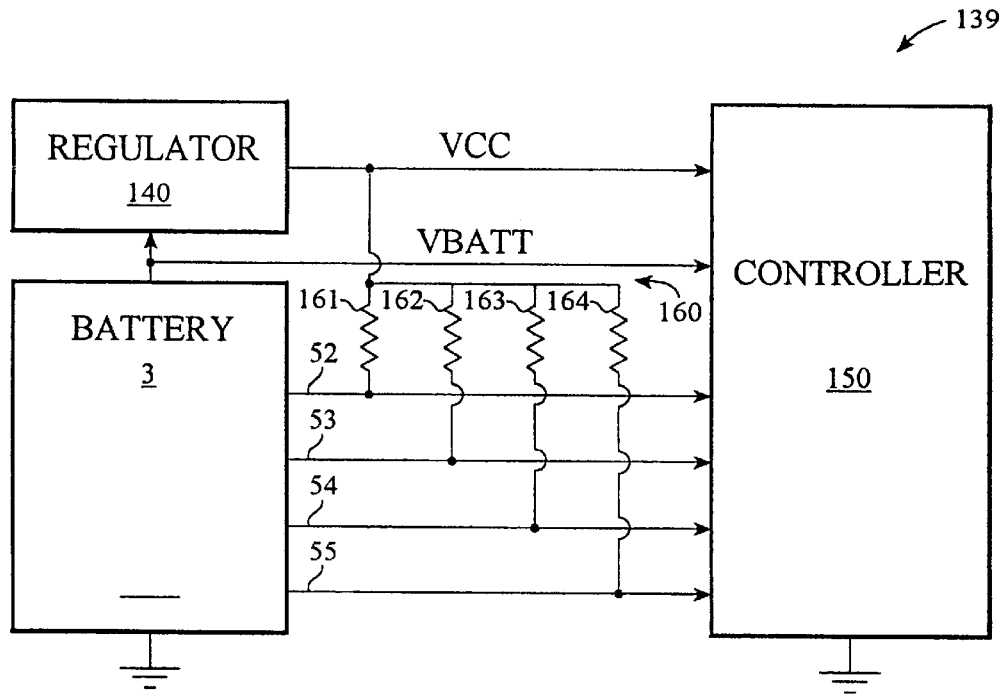
FIG. 4 is a block diagram of a battery identification system according to the present invention, including a regulator, a controller, a memory and a plurality of resistors.

FIG. 4 is a block diagram of a battery identification system according to one embodiment of the present invention. In particular, the battery identification system 139 includes a battery 3, a voltage regulator 140, a controller 150, a memory 151, a plurality of resistors 160 including first through fourth resistors 161–164 connected to regulator 140. Battery 3 and controller 150 are each grounded and each is further connected to regulator 140. Battery 3 particularly provides power to regulator 140 at its positive terminal. Regulator 140 provides a regulated voltage level VCC to controller 150 and resistors 160 including resistors 161–164 which are connected to corresponding lines 52–55 to provide respective sense inputs 51–54 to controller 150. Controller 150 connected to the memory 151 and is programmed according to the present invention to identify battery types from logical state code words input along sense lines 52–55 to determine which of a number of battery kinds are sensed according to the predetermined width of a word including sense inputs 51–54. Controller 150 is additionally provided with the positive voltage level VBATT of battery 3 to evaluate the operational status of battery 3 in view of how far along the battery voltage is on a characteristic of battery lifetime, for the particular battery kind which has been identified according to the present invention. Respective sense lines 52–54 are connected to VCC through respective resistors 161–164 to obtain a pull-up bias for the respective inputs 51–54 before and during battery installation.

Figure 5:
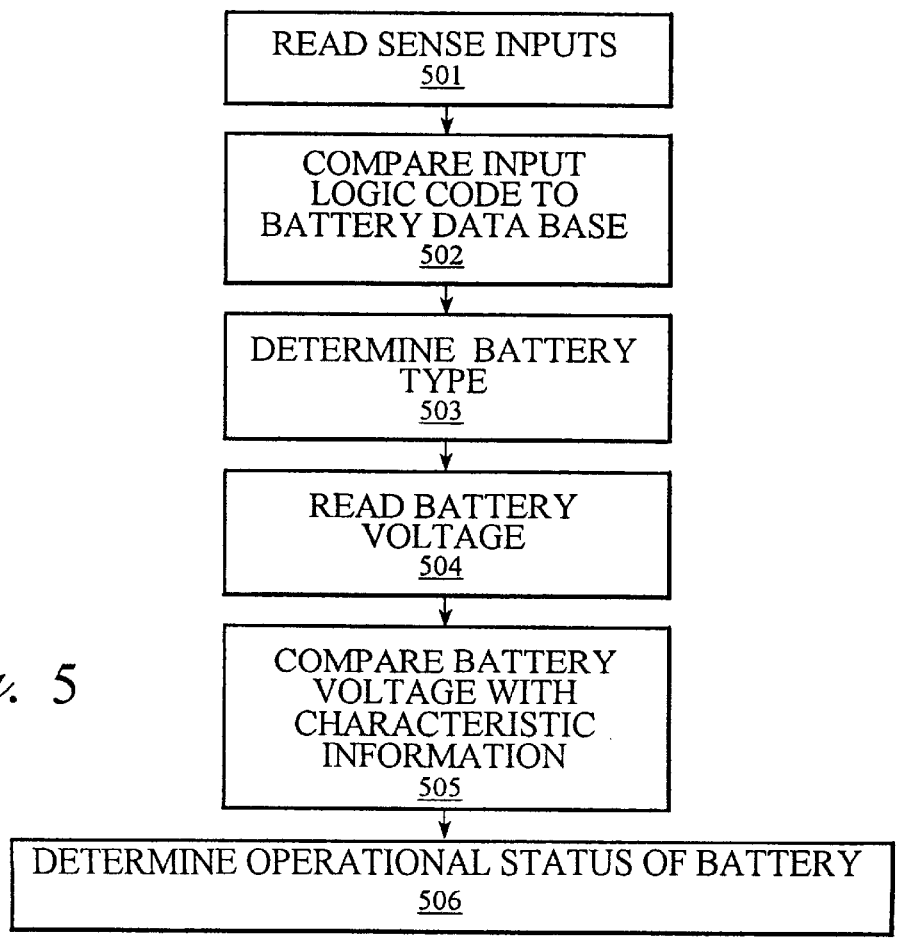
FIG. 5 is a flow chart of battery identification and operational status determination according to one embodiment of the present invention.

FIG. 5 is a flow chart of battery identification and operational status determination according to the present invention. In particular, to evaluate 500 a battery 3 according to the present invention, controller 150 reads 501 sense inputs 51–54 to determine their respective logical states upon measuring a selected battery for its particular coding arrangement or sequence. Controller 150 maintains a battery database which according to one embodiment of the present invention defines the correspondence of codes of logical states with battery types. A look-up table or a programmed read only memory (ROM) is used according to one embodiment of the present invention to relate particular codes with corresponding kinds of batteries. Next according to the present invention, the input logical code which has been read is compared 502 to the battery database identifying the kinds of batteries. Then, the battery type is determined 503 according to the information held in the database. Further, the level of battery voltage is read 504 on line VBATT in FIG. 4, for example. The read voltage is then compared 505 with a characteristic information about battery voltage over time characteristic of the particular battery type. By comparing the sensed voltage with the characteristic for the particular battery type, its operational status is determined, e.g., whether the battery is almost dead and needs replacement.

What is claimed is:

1. An elongated battery having first and second electrically conductive (EC) ends of opposite electric polarity, said EC ends defining a longitudinal axis, and having a non-conductive outer surface region (NOSR) between said first and second EC ends, further including at least a single region (ASR) of electrically conductive material (ECM) secured externally to said NOSR and identifying the elongated battery as a particular kind of battery.

2. The elongated battery according to claim 1 wherein said ASR extends substantially longitudinally around said elongated battery.

3. The elongated battery according to claim 1 wherein each of said ASRs extend substantially around said NOSR.

4. The elongated battery according to claim 1 wherein said ASR includes at least first and second longitudinally separated bands for coded battery typing.

5. A non-rechargeable battery (NB) having first and second conductive ends (CEs) of opposite polarity and an outer surface (OS) between said first and second CEs, said outer surface (OS) defining at least a single non-conductive band having an edge extending around at least one of said first and second conductive ends, and said OS defining a plurality of battery type identification zones (BT IZs) extending longitudinally between said first and second CEs.

6. The NB according to claim 5 wherein each of said BTIZs define a substantially circumferential band around said outer surface.

7. The NB according to claim 6 wherein selected ones of said substantially circumferential bands are conductive.

8. The NB according to claim 6 wherein said BTIZs define at least a single binary identification code used for battery typing.

9. An appliance to be powered by at least a single internally mounted battery, each battery of said at least a single having spaced identification zones having individual selected electrical conductivity states, and first and second electrically opposite poles, said appliance comprising a containment structure (CS) defining mounting surface (IRS) for securing said at least a single battery, said CS defining an array of type detection elements spaced to permit electrical communication with corresponding ones of said spaced identification zones.

10. The appliance according to claim 9 further including a power detection element correctable to a selected one of said at least a single internally mounted battery.

11. The appliance according to claim 9 wherein said at least a single battery is secured to said appliance.

\* \* \* \* \*